US012794360B2

(12) United States Patent
Je et al.

(10) Patent No.: US 12,794,360 B2
(45) Date of Patent: Nov. 10, 2026

(54) LOAD DRIVING DEVICE

(71) Applicant: KOREA ADVANCED INSTITUTE OF SCIENCE AND TECHNOLOGY, Daejeon (KR)

(72) Inventors: Min Kyu Je, Daejeon (KR); Dong Hee Cho, Daejeon (KR); Chul Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 583 days.

(21) Appl. No.: 18/729,077

(22) PCT Filed: Dec. 22, 2021

(86) PCT No.: PCT/KR2021/019563
§ 371 (c)(1),
(2) Date: Jul. 15, 2024

(87) PCT Pub. No.: WO2022/139435
PCT Pub. Date: Jun. 30, 2022

(65) Prior Publication Data

US 2024/0405672 A1 Dec. 5, 2024

(30) Foreign Application Priority Data

Dec. 22, 2020 (KR) ........................ 10-2020-0180710

(51) Int. Cl.
*H02M 3/07* (2006.01)
*H02J 7/00* (2006.01)
*H02J 7/94* (2026.01)

(52) U.S. Cl.
CPC ............... *H02M 3/07* (2013.01); *H02J 7/855* (2026.01); *H02J 7/94* (2026.01)

(58) Field of Classification Search
CPC .......... H02M 3/07; H02M 3/073; H02M 7/10; H02M 7/103; H02M 7/106; H02M 1/088;
(Continued)

(56) References Cited

U.S. PATENT DOCUMENTS 10,615,686 B2 * 4/2020 Woo ...................... H02M 3/158
11,990,831 B2 * 5/2024 Petersen ............... G06F 1/3206
(Continued)

FOREIGN PATENT DOCUMENTS

CN 105939126 A 9/2016
JP H09-007778 A 1/1997
(Continued)

OTHER PUBLICATIONS

International Search Report for PCT/KR2021/019563 mailed Apr. 14, 2022 from Korean Intellectual Property Office.

*Primary Examiner* — Jeffrey A Gblende
(74) *Attorney, Agent, or Firm* — Paratus Law Group, PLLC

(57) ABSTRACT

A load driving device includes a step-up converter for raising a voltage provided by a power supply and supplying same to a load unit, by comprising a first driving unit and a second driving unit, the first driving unit comprising an inductor and a first fly capacitor, and charging energy provided by the power supply, as the inductor and the first fly capacitor are connected in parallel in a first phase, and discharging the charged energy, as the inductor and the capacitor are connected in series in a second phase, and the second driving unit comprising a second fly capacitor for charging energy provided by the power supply in the second phase and discharging the energy charged in the second phase; and a current control unit for controlling a current provided to the load unit by detecting the current flowing in the load unit and controlling the step-up converter.

10 Claims, 10 Drawing Sheets

(58) Field of Classification Search
CPC ..... H02M 2003/071; H02M 2003/072; H02M 2003/075; H02M 2003/076; H02M 2003/077; H02M 2003/078; H02M 2001/007; H02M 2001/0048; H02M 1/0095; H02J 7/94; H02J 7/90; H02J 7/855
See application file for complete search history.

(56) References Cited

U.S. PATENT DOCUMENTS

| | | | | |
|---|---|---|---|---|
| 2019/0068054 | A1 | 2/2019 | Ongaro et al. | |
| 2022/0376616 | A1* | 11/2022 | Hu | H02M 1/0095 |
| 2023/0275452 | A1* | 8/2023 | Li | H01M 10/441 320/126 |

FOREIGN PATENT DOCUMENTS

| | | | |
|---|---|---|---|
| JP | 2010-045966 | A | 2/2010 |
| WO | WO 2020/077427 | A1 | 4/2020 |

* cited by examiner

LOAD DRIVING DEVICE

CROSS-REFERENCE TO PRIOR APPLICATIONS

This Application is a National Stage Patent Application of PCT International Application No. PCT/KR2021/019563 (filed on Dec. 22, 2021), which claims priority to Korean Patent Application No. 10-2020-0180710 (filed on Dec. 22, 2020), which are all hereby incorporated by reference in their entirety.

BACKGROUND

The present invention relates to a load driving device.

Phototherapy is a non-surgical treatment method using light, is safe, has no side effects, and has a wide treatment range, and thus its marketability is increasing every year. In phototherapy, light in the near-infrared band or red band stimulates mitochondria in cells to increase the concentration of cytochrome C oxidase (CCO) enzyme in mitochondria. The increased CCO enzyme increases cellular respiration and consequently increases the generation of adenosine triphosphate (ATP), reactive oxygen species (ROS), and nitric oxide (NO). ATP is energy used by cells and increases cell activity, and ROS and NO help increase the blood flow rate and relax and contract blood vessels to increase blood circulation and reduce inflammation.

Meanwhile, in the case of a light source used in phototherapy, much research is being conducted on organic light emitting diodes (OLEDs) in the form of surface light sources because they have excellent efficiency and therapeutic effects.

SUMMARY

Due to the nature of OLEDs, which use organic materials, it is vulnerable to material degradation and changes in electrical characteristics due to long-term use. In order to solve this problem, many circuits are operated in two stages including a power supply stage and a current control stage. However, according to the related art, there is a difficulty in that power consumption is large because a load is driven in two stages. In the case of a battery, as the size of the battery decreases, the output voltage and lifetime of the battery also decrease. For a stable phototherapy system, a highly efficient driving device that can compensate for the degradation and changes in electrical characteristics of batteries and light-emitting devices is needed.

One aspect of the present invention provides a load driving device including a step-up converter which includes a first driving unit including an inductor and a first fly capacitor and configured to charge energy provided from a power supply by connecting an inductor and a first fly capacitor in parallel in a first phase and discharge the charged energy by connecting the inductor and the first fly capacitor are connected in series in a second phase, and a second driving unit including a second fly capacitor configured to charge energy provided by the power supply in the second phase and discharge the energy charged in the first phase, which boosts a power supply voltage provided by the power supply and provides the power supply voltage to a load unit; and a current controller configured to detect a load current flowing in the load unit and control the step-up converter to control a current provided to the load unit.

The first driving unit and the second driving unit may provide voltages to the load unit, and the voltage provided by the first driving unit to the load unit and the voltage provided by the second driving unit to the load unit may be voltages of opposite signs.

The first phase and the second phase may be combined to form one period.

The first driving unit may further include a connection control switch whose one end and the other end are connected to the inductor and the first fly capacitor, respectively, and the connection control switch is turned off to connect the inductor and the first fly capacitor in series.

The first driving unit may further include a ground connection switch which is turned on in the first phase to connect a ground to the first driving unit and the second driving unit, and a first driving unit connection switch which is turned on in the second phase to connect the first driving unit to the load unit to provide energy.

The second driving unit may further include a second driving unit ground connection switch which is turned on in the second phase to connect a ground to the second driving unit, and a second driving unit connection switch which is turned on in the first phase to connect the second driving unit to the load unit to provide energy.

The load unit may include a first load capacitor whose one end is connected to the first driving unit and the other end is connected to a ground in series, a second load capacitor whose one end is connected to the second driving unit and the other end is connected to the ground in series, and a load connected to the first load capacitor and the second load capacitor in parallel.

The power supply may be a flexible battery, and the load may be a light emitting device.

The step-up converter may output a boosted voltage to the load unit by connecting the inductor to the capacitor in series in the second phase.

The current controller may include a detection voltage generating unit configured to output a detection voltage corresponding to an average of a current flowing in the load unit, and a control signal generating unit configured to generate control signals for the first driving unit and the second driving unit from the detection voltage.

Another aspect of the present invention provides a load driving device including a bipolar driving unit configured to receive a power supply voltage from a power supply and output a negative driving voltage and a positive driving voltage in different phases, and a current controller configured to detect a load current provided to a load by the bipolar driving unit and generate a control signal for controlling the bipolar driving unit, wherein the current controller includes: a detection voltage generating unit configured to generate a detection voltage corresponding to the load current from a scaled-down current generated by scaling the load current down, a low-pass filter configured to receive the detection voltage and generate and output a detection signal corresponding to an average of the load current, and a control signal generating unit configured to generate a control signal for controlling operations of the first driving unit and the second driving unit from the detection signal.

The bipolar driving unit may include a first connection transistor configured to provide a positive driving voltage to the load, and the detection voltage generating unit may include a scaled transistor whose gate electrode and drain electrode are connected to the first connection transistor to output the scaled-down current, and a detection resistor configured to receive the scaled-down current and generate the detection voltage corresponding to the scaled-down current.

The detection voltage generating unit may include a detection amplifier and a pass transistor; in the detection amplifier, the positive driving voltage may be provided to a non-inverted input, a source electrode of the scaled transistor may be connected to an inverted input to generate the positive driving voltage, and an output node may be connected to a gate electrode of the pass transistor; and the pass transistor may provide the scaled-down current to the detection resistor.

The current controller may further include a bootstrap circuit configured to generate a bootstrap driving voltage which is the sum of the power supply voltage and the positive driving voltage, and the detection amplifier may operate by providing the bootstrap driving voltage as an upper driving voltage and the driving voltage as a lower voltage.

The bootstrap circuit may include a bootstrap capacitor charged with the power supply voltage; and first and second bootstrap transistors of which drain electrodes are connected to one end of the bootstrap capacitor, gate electrodes are provided with the power supply voltage, and source electrodes are provided with a first bootstrap voltage and a second bootstrap voltage.

The current controller may further include an error amplifier configured to amplify a difference between the detection signal and a reference voltage, and the control signal generating unit may include a pulse width modulation (PWM) modulator configured to receive an output of the error amplifier and a periodic signal and generate a PWM control signal, and a gate driver configured to generate a control signal which corresponds to the PWM control signal and controls the bipolar driving unit.

The bipolar driving unit may include a first driving unit configured to output the positive driving voltage, and a second driving unit configured to output the negative driving voltage, wherein, when the first driving unit outputs the positive driving voltage, the second driving unit may be charged with energy provided from the power supply, and when the second driving unit outputs the negative driving voltage, the first driving unit may be charged with energy provided from the power supply.

The power supply may be a flexible battery and the load may be a light emitting device.

According to the present invention, since a load is driven by a converter with high conversion efficiency and a load current is controlled by detecting a current flowing in the load, there is an advantage of being robust against the degradation and changes in electrical characteristics of the load. In addition, according to the present invention, since the load is controlled simultaneously with the load driving, there is an advantage of lowering power consumption compared to the related art.

DETAILED DESCRIPTION

Figure 1:
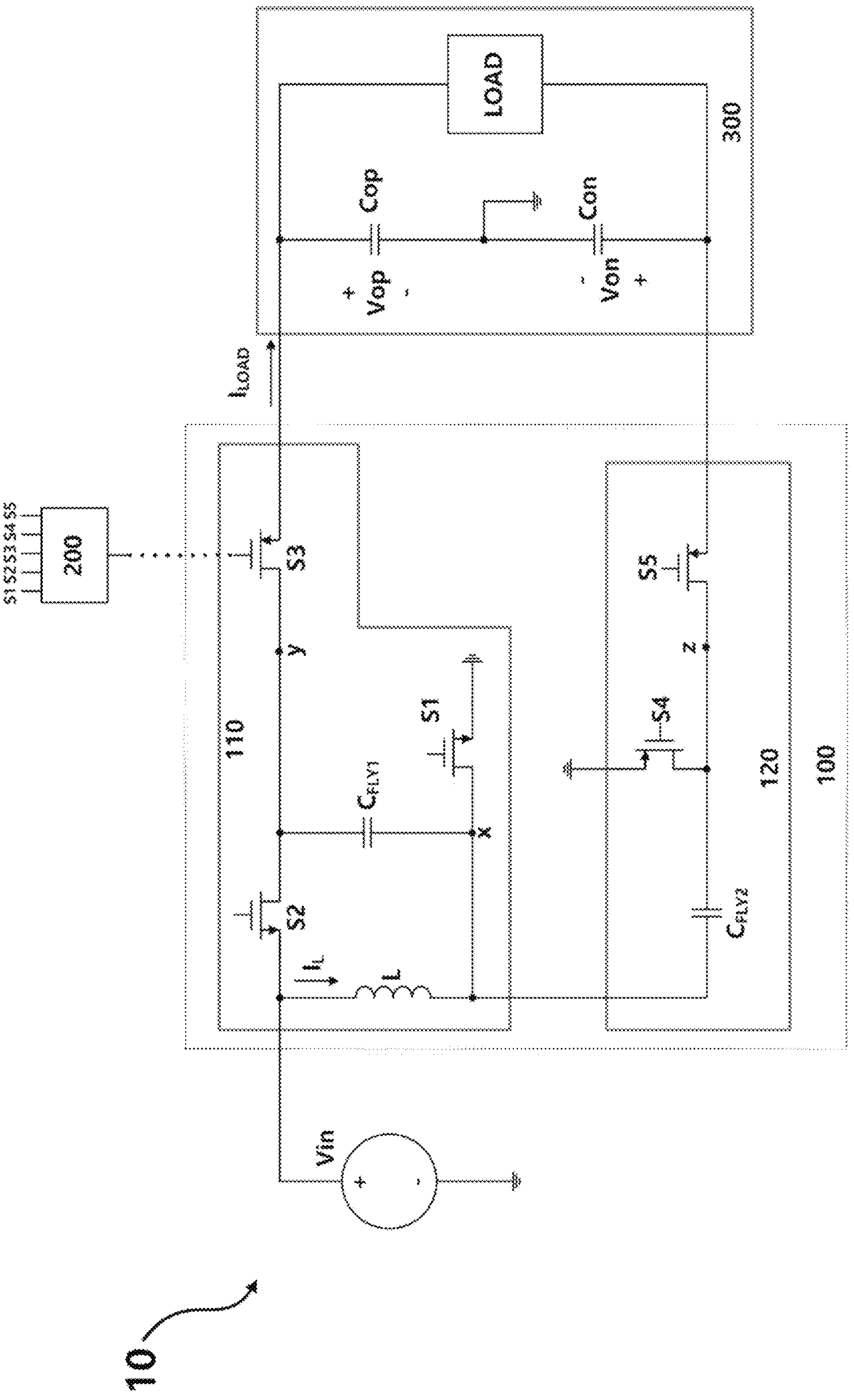
FIG. 1 is a diagram illustrating an overview of a load driving device according to the present invention.

Hereinafter, the present invention will be described with reference to the accompanying drawings. FIG. 1 is a diagram illustrating an overview of a load driving device 10 according to the present invention. Referring to FIG. 1, the load driving device 10 according to the present invention includes a step-up converter 100 which includes a first driving unit 110 configured to charge energy provided from a power supply by connecting an inductor L and a first fly capacitor $C_{FLY1}$ in parallel in a first phase Φ1 and discharge the charged energy by connecting the inductor L and the first fly capacitor $C_{FLY1}$ in series in a second phase Φ2, and a second driving unit 120 including a second fly capacitor $C_{FLY2}$ configured to charge energy provided by the power supply in the second phase Φ2 and discharge the energy charged in the first phase Φ1, which boosts a power supply voltage Vin provided by the power supply and provides the power supply voltage Vin to a load unit 300, and a current controller 200 configured to detect a load current $I_{LOAD}$ flowing in the load unit 300 and control the step-up converter 100 to control the current provided to the load unit 300.

The load unit 300 includes capacitors Cop and Con connected to a load LOAD in series, and branches of the capacitors Cop and Con connected in series are connected to the load LOAD in parallel. As an example, the load LOAD may be an organic light-emitting diode (OLED), for example, a surface-emitting OLED. As another example, the load LOAD may be a light emitting device such as an LED. The power source may be a battery which provides a DC voltage or DC current. As an example, the power supply may be a rechargeable battery or a flexible battery capable of being bent.

Figure 2:
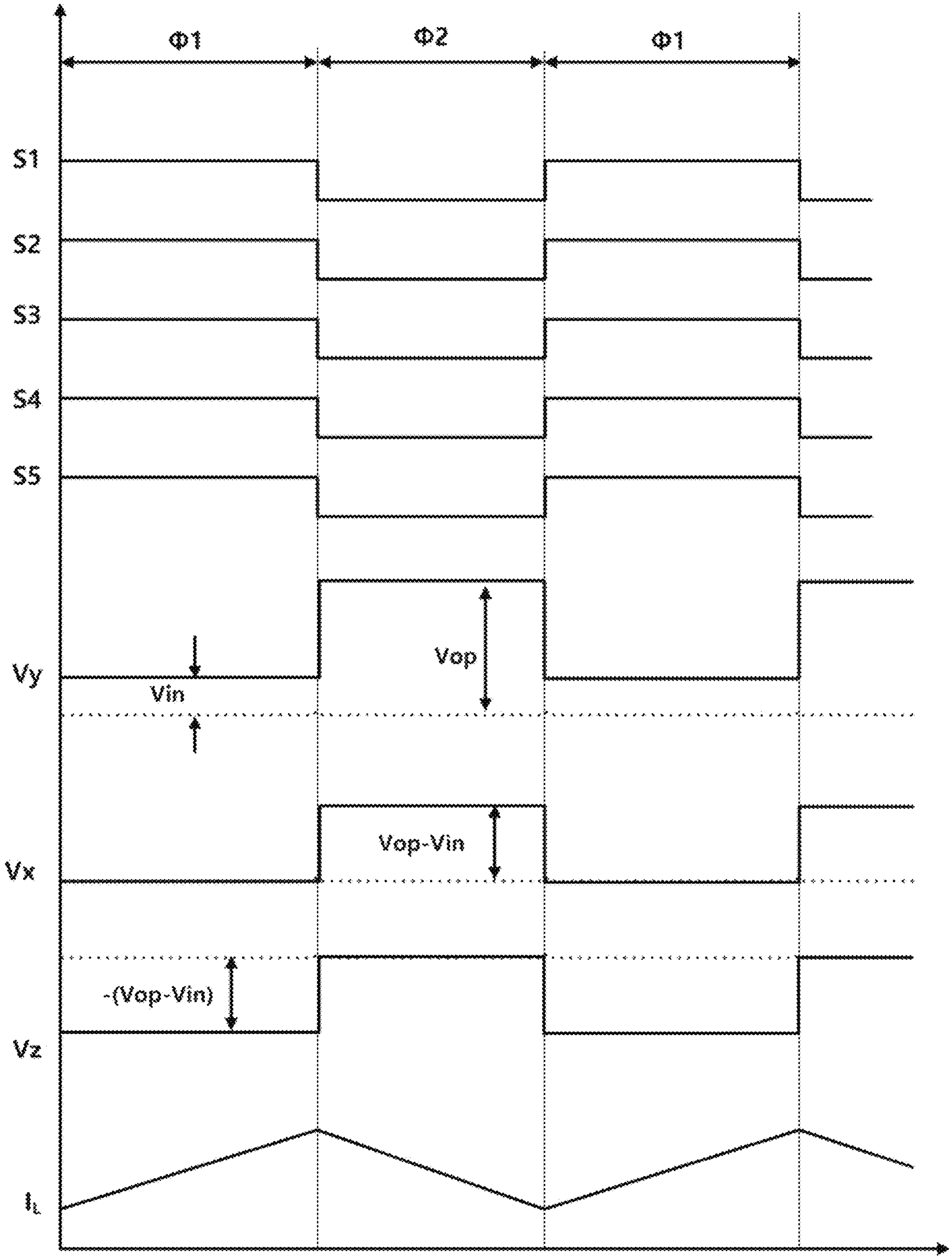
FIG. 2 is a timing diagram of the load driving device according to the present invention.
Figure 3:
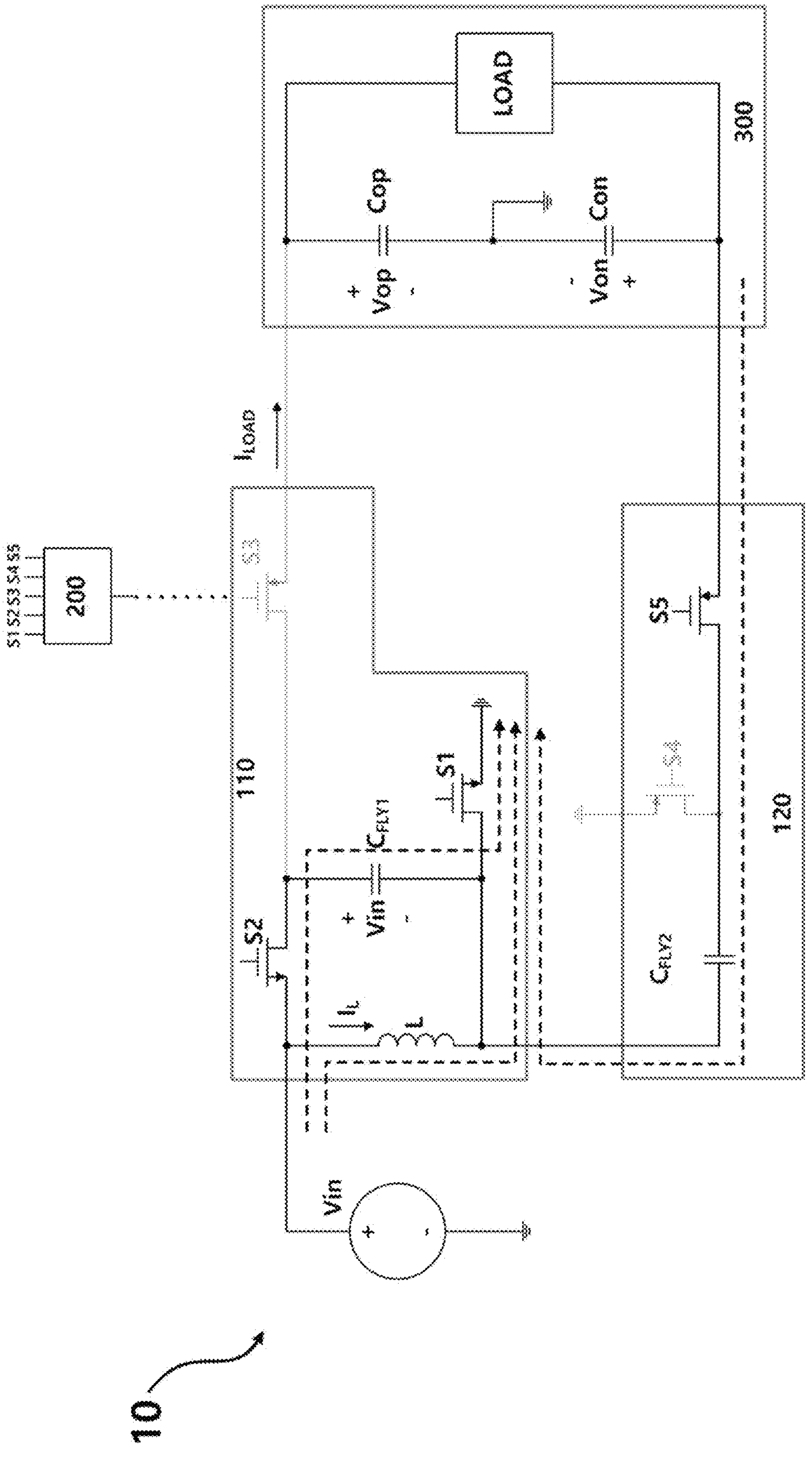
FIG. 3 is a diagram illustrating an overview of the operation of the load driving device in a first phase.

FIG. 2 is a timing diagram of the load driving device 10 according to the present embodiment, and FIG. 3 is a diagram illustrating an overview of the operation of the load driving device 10 in a first phase. Referring to FIGS. 1 to 3, in the first phase Φ1, a control signal in a logic high state is provided to gate electrodes of a first ground connection switch S1 and a first driving unit connection switch S3, and thus the first ground connection switch S1 and the first driving unit connection switch S3 are turned on. Therefore, the inductor L and the first fly capacitor $C_{FLY1}$ are connected in parallel to charge energy provided by the power supply. In the first phase Φ1, a voltage Vy at a node y corresponds to the power supply voltage Vin. As an example, in the first phase Φ1, the power supply voltage Vin charges the first fly capacitor $C_{FLY1}$, and a current IL flowing in the inductor L increases over time.

In addition, in the first phase Φ1, since both the first driving unit 110 and the second driving unit 120 are connected to a ground potential through the first ground connection switch S1, a voltage Vx at a node x corresponds to a ground potential.

Although a control signal in a logic high state provided to a gate electrode of a second ground connection switch S4 turns off the second ground connection switch S4, a control signal in a logic high state provided to a gate electrode of a second driving unit connection switch S5 turns on the second driving unit connection switch S5. Therefore, as shown by a voltage Vz in FIG. 2, the second fly capacitor $C_{FLY2}$ provides a negative driving voltage to the load unit 300. As described below, the second fly capacitor $C_{FLY2}$ provides the negative driving voltage, which corresponds to a difference between a positive voltage Vop provided to the load and the power supply voltage Vin provided by the power supply, to the load unit 300, thereby driving the load LOAD.

As illustrated in FIG. 3, in the first phase Φ1, the inductor L and the first fly capacitor $C_{FLY1}$ are charged with energy through different current paths. Therefore, according to the present embodiment, an advantage of being able to reduce loss due to a DC equivalent resistance of the inductor L during energy charging is provided.

Figure 4:
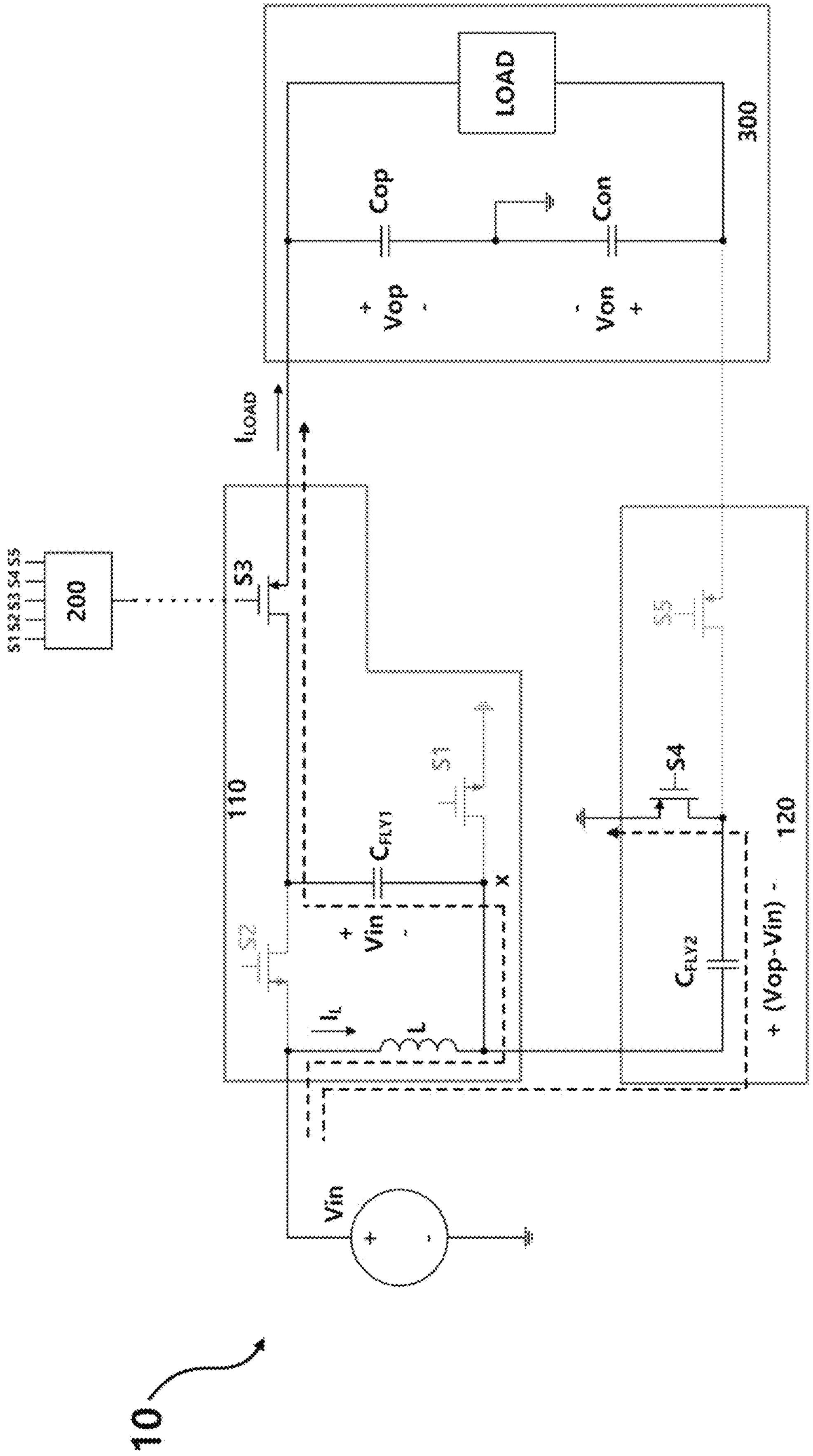
FIG. 4 is a diagram illustrating an overview of the operation of the load driving device in a second phase.

FIG. 4 is a diagram illustrating an overview of the operation of the load driving device 10 in the second phase Φ2. Referring to FIGS. 1 to 4, in the second phase Φ2, a control signal in a logic low state is provided to the gate electrodes of the first ground connection switch S1 and a connection control switch S2, and thus the first ground connection switch S1 and the connection control switch S2 are turned off. Therefore, the inductor L and the first fly capacitor $C_{FLY1}$, which were connected in parallel in the first phase Φ1, are connected in series. In addition, a control signal in a logic high state is provided to a gate electrode of the first driving unit connection switch S3, and thus the first driving unit connection switch S3 is turned on to connect the first driving unit 110 to the load unit 300.

The positive driving voltage Vop provided from the first driving unit 110 to the load unit 300 in the second phase Φ2 corresponds to the sum of the voltage charged in the inductor connected to the power supply voltage Vin in series and the power supply voltage Vin charged in the capacitor. That is, as shown in FIG. 2, the voltage at node y in the first phase 1 corresponds to the power supply voltage Vin, whereas in the second phase Φ2, the voltage Vy is boosted to correspond to the sum of the power supply voltage Vin, the voltage charged in the inductor L, and the power supply voltage Vin charged in the capacitor and is provided to the load unit 300 as the positive driving voltage Vop.

In addition, since the first ground connection switch S1 is turned on in the first phase Φ1, the voltage Vx at node x corresponds to a ground voltage. However, in the second phase Φ2, since the first ground connection switch S1 is turned off and the inductor L and the first fly capacitor $C_{FLY1}$ are connected in series, the voltage Vx corresponds to a difference between the positive driving voltage Vop and the power supply voltage Vin charged in the first fly capacitor $C_{FLY1}$.

In the second phase Φ2, the second fly capacitor $C_{FLY2}$ is charged with energy provided from the power supply. In the second phase Φ2, the second fly capacitor $C_{FLY2}$ is connected to node x and the turned-on second ground connection switch S4. Therefore, a voltage corresponding to the difference between the positive voltage Vop, which is a voltage corresponding to Vx, and the power supply voltage Vin provided by the power supply charge the second fly capacitor $C_{FLY2}$. In a subsequent first phase Φ1, the second fly capacitor $C_{FLY2}$ provides the charged voltage to the load unit 300 as a negative driving voltage Von.

[Equation 1]

$$\eta_{conv.} = \frac{1}{1-D} \tag{1}$$

$$\eta = \frac{3-D}{1-D} \tag{2}$$

The conversion efficiency nconv of the step-up converter according to the related art may be expressed as ① in Equation 1. However, the conversion efficiency n according to the present embodiment may be calculated using ② of Equation 1, and assuming the same duty ratio D, from the conversion efficiency n, an efficiency increase of 200% to 250% or more can be typically achieved compared to the related art.

As the positive driving voltage Vop and the negative driving voltage Von are provided to the capacitors Cop and Con during initial driving, a current flows and is charged, but the current is not enough to reach a steady state. Therefore, during a period including the first phase Φ1 and the second phase Φ2, the load current $I_{LOAD}$ flows in the first driving unit connection switch S3 and the second driving unit connection switch S5. Similarly, due to charge balancing between the first fly capacitor $C_{FLY1}$ and the second fly capacitor $C_{FLY2}$, the load current $I_{LOAD}$ also flows in the connection control switch S2 and the second ground connection switch S4 for one period. From this, the current provided by the power supply in the present embodiment is equal to the sum of the current IL flowing in the inductor and the load current $I_{LOAD}$ flowing in the load. Assuming that the load driving circuits according to the related art and the present embodiment transmit the same power to the load, the current provided by the power supply in the load driving circuit according to the present embodiment is smaller than the current according to the related art by as much as the load current $I_{LOAD}$. Therefore, in the present embodiment, as the current $I_{LOAD}$ flowing in the load increases, the inductor current decreases further and the loss decreases.

In the present embodiment, the load LOAD is driven by dividing phases and providing bipolar driving voltages of the positive driving voltage Vop and the negative driving voltage Von for each phase. With this configuration, a voltage formed between the drain electrodes and source electrodes of the semiconductor switches included in the first driving unit 110 and the second driving unit 120 may be lowered to a difference (Vop–Vin) between the positive driving voltage and the power supply voltage. This voltage difference is a level that is lower than ½ of the voltage difference between the drain and the source of the step-up converter according to the related art. Thus, electrical stress applied to the semiconductor switches included in the step-up converter 100 can be reduced.

Figure 5:
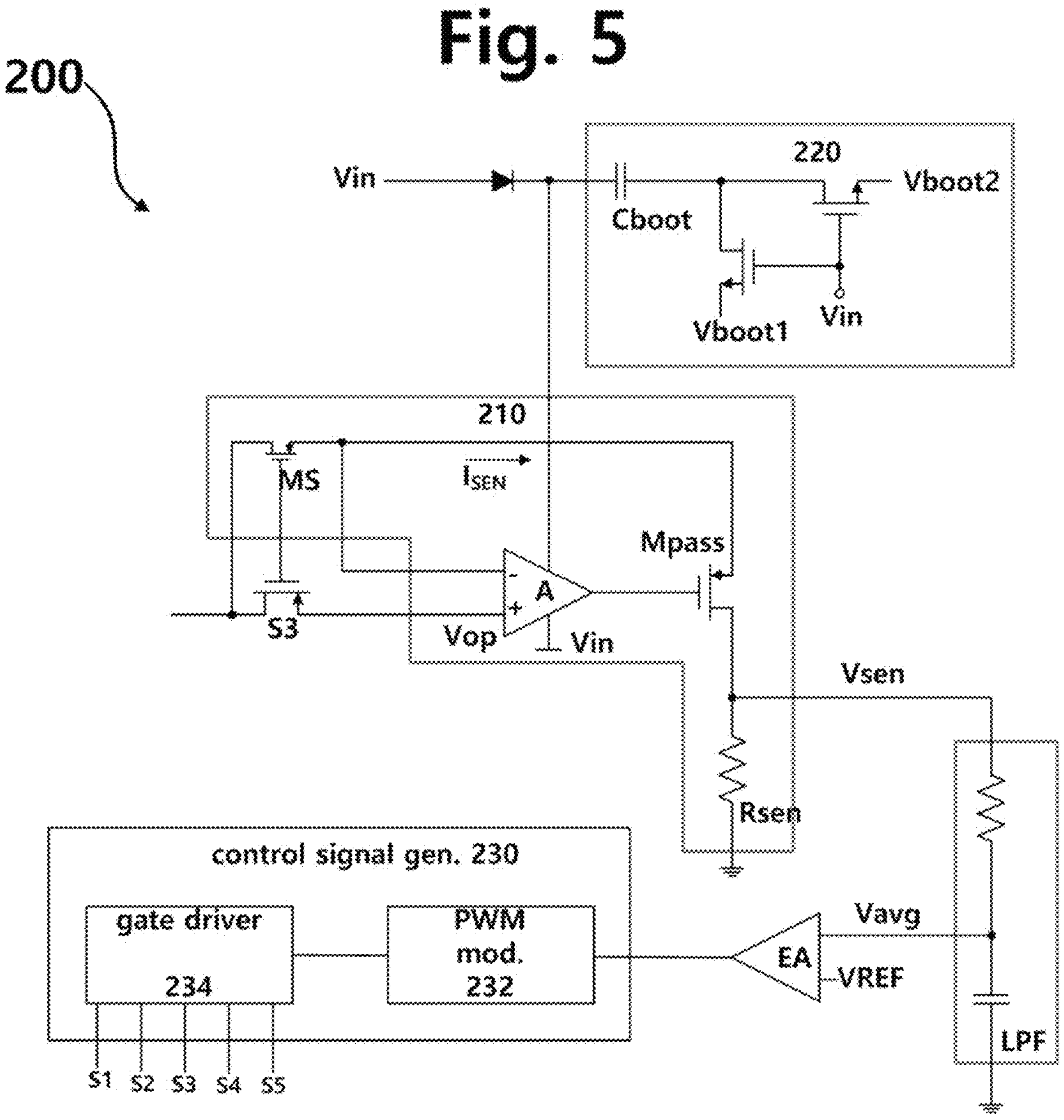
FIG. 5 is a diagram illustrating an overview of a current controller of the present invention.

Hereinafter, the operation of the current controller 200 will be described with reference to FIGS. 5 to 8. FIG. 5 is a diagram illustrating an overview of the current controller 200 of the present invention. Referring to FIG. 5, the current controller 200 includes a detection voltage generating unit 210 configured to generate a scaled-down current Isen formed by scaling the load current $I_{LOAD}$ down to form a detection voltage Vsen corresponding to the load current Isen, a low-pass filter LPF configured to receive the detection voltage Vsen and form and output an average detection signal Vavg corresponding to an average of the load current ILOAD, and a control signal generating unit 230 configured to control the operations of the first and second driving units in response to the average detection signal Vavg.

Figure 6:
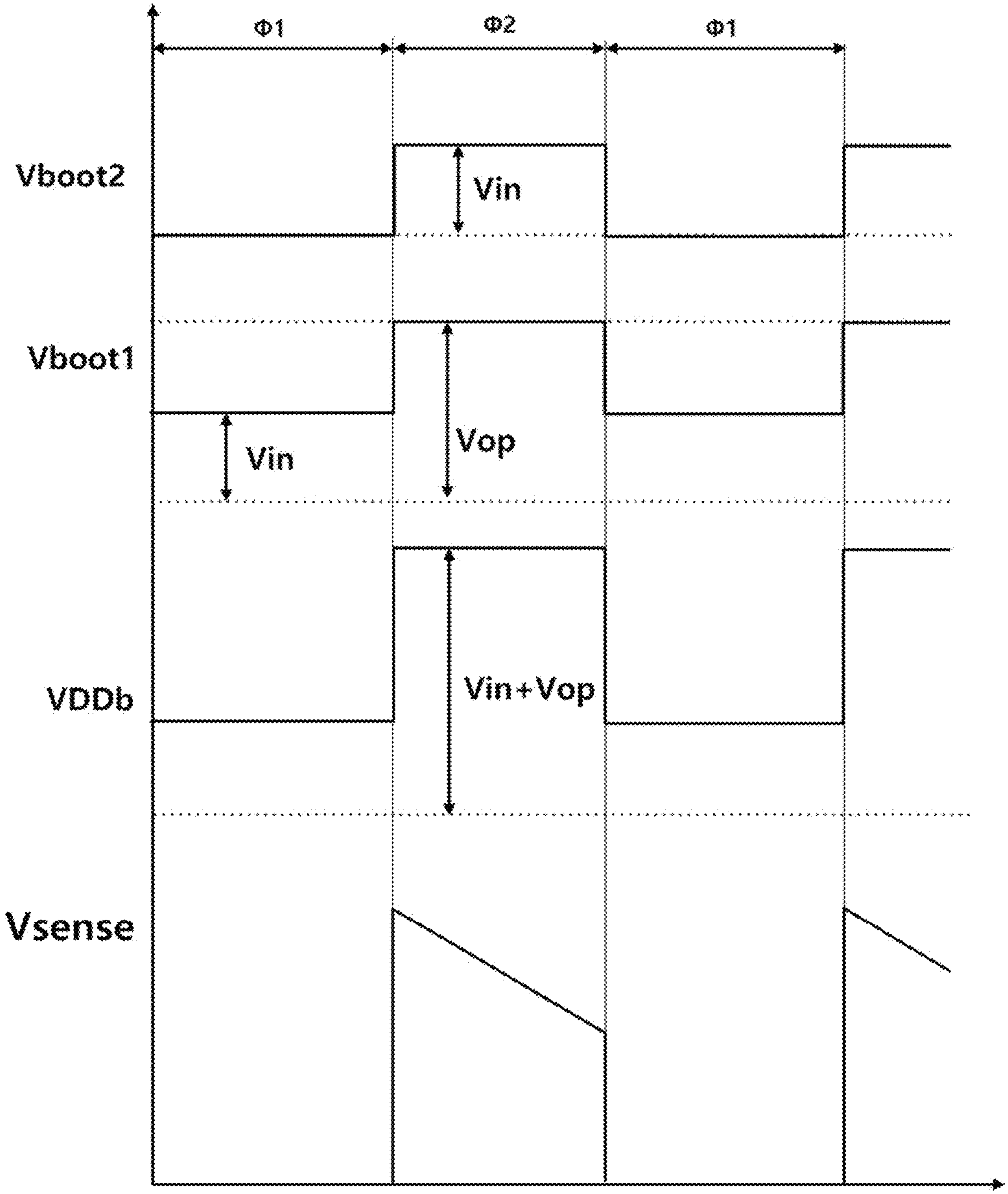
FIG. 6 is a diagram illustrating an overview of a bootstrap voltage and a bootstrap driving voltage for describing the operation of the bootstrap circuit (220).
Figure 7:
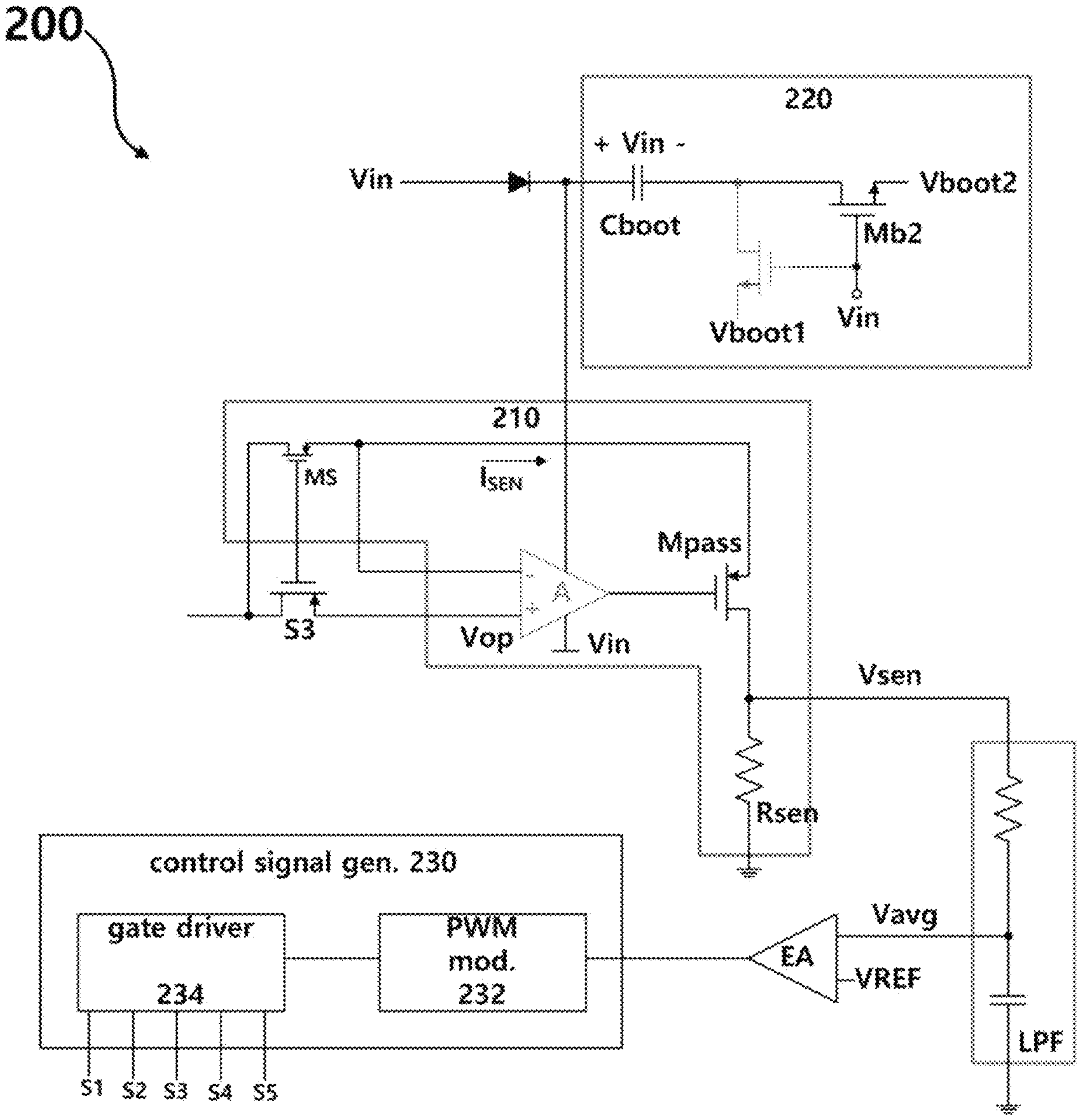
FIG. 7 is an exemplary diagram illustrating the operation of the current controller in the first phase.

FIG. 6 is a diagram illustrating an overview of bootstrap voltages Vboot1 and Vboot2 and a bootstrap driving voltage VDDb for describing the operation of a bootstrap circuit 220, and FIG. 7 is an exemplary diagram illustrating the operation of the current controller 200 according to the present embodiment. Referring to FIGS. 5 to 7, in the first phase Φ1, the power supply voltage Vin is provided to a gate electrode of a second bootstrap transistor Mb2, and a ground voltage is provided to a source electrode of the second bootstrap transistor Mb2 by a second bootstrap signal Vboot2 so that the second bootstrap transistor Mb2 is turned on.

The power supply voltage Vin is charged in a bootstrap capacitor Cboot through a backflow prevention diode and the turned-on second bootstrap transistor Mb2. Since the power supply voltage Vin is provided as both upper and lower driving voltages of a detection amplifier A, the detection amplifier A operates. Therefore, a pass transistor Mpass is turned off, and both of the detection voltage Vsen and the average detection signal Vavg output from the low-pass filter LPF to which the detection voltage Vsen is provided to correspond to the ground voltage. An error amplifier EA amplifies a difference between a reference voltage Vref and the average detection signal Vavg and provides the amplified difference to the control signal generating unit 230.

A pulse width modulation (PWM) modulator 232 receives a signal output from the error amplifier EA. In addition, the PWM modulator 232 receives a periodic signal such as a triangle wave or a sawtooth wave from an oscillator (not shown) and compares the periodic signal with the signal output from the error amplifier EA to form a PWM control signal.

A gate driver 234 may increase the level of the PWM control signal output from the PWM modulator 232 to form and output a control signal provided to gates of the switches included in the first and second driving units 110 and 120.

Figure 8:
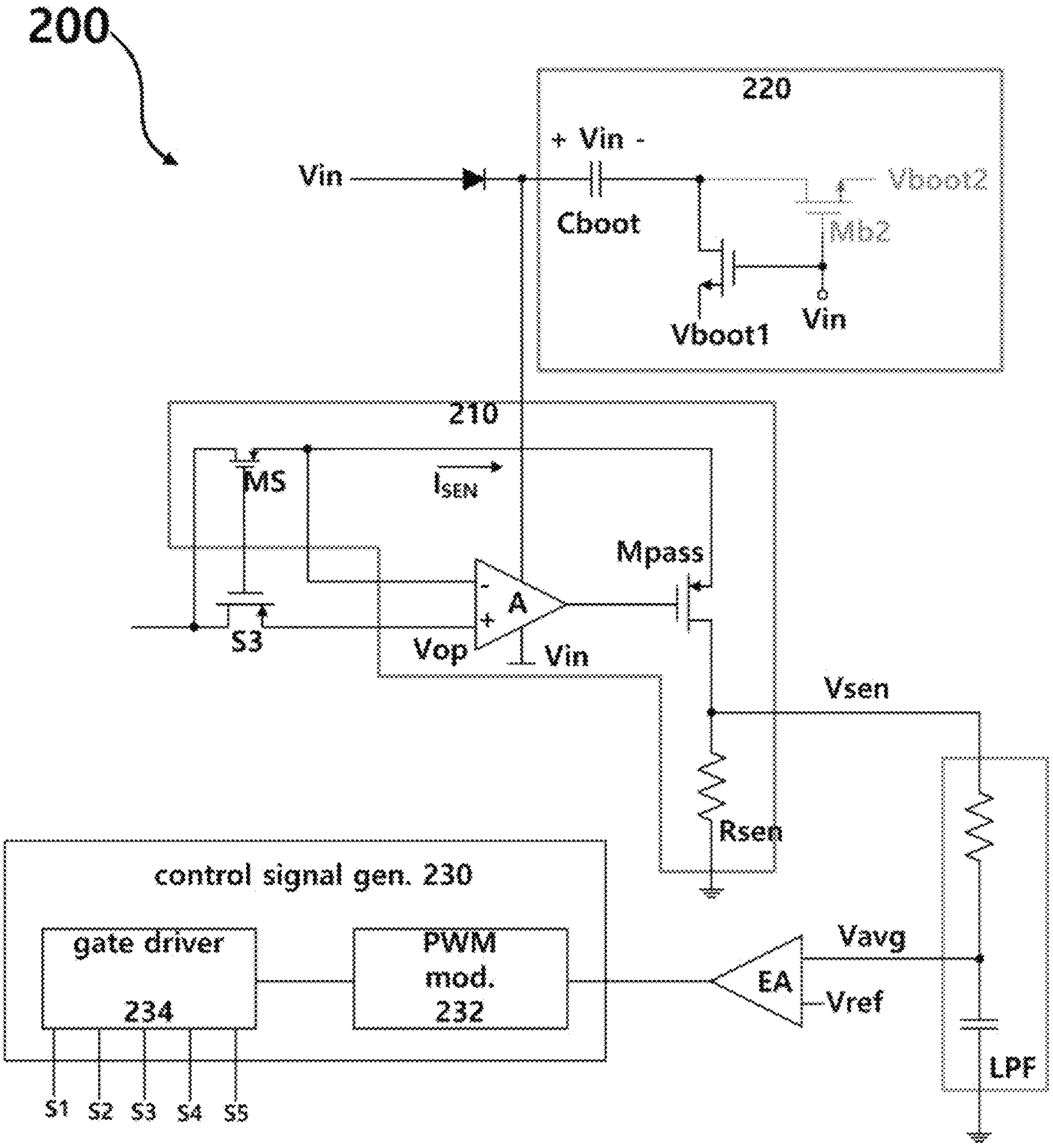
FIG. 8 is a diagram illustrating the operation of the current controller in the second phase.

FIG. 8 is a diagram for describing the operation of the current controller 200 in the second phase Φ2. Referring to FIGS. 5 to 8, in the second phase Φ2, as the power supply voltage Vin is provided to both the source electrode and the gate electrode of the second bootstrap transistor Mb2, the second bootstrap transistor Mb2 is turned off. However, since the positive driving voltage Vop is provided to a source electrode of a first bootstrap transistor Mb1 and the power supply voltage Vin is provided to a gate electrode of the first bootstrap transistor Mb1, a voltage difference between the gate electrode and the source electrode is lower than a threshold voltage so that the first bootstrap transistor Mb1 is turned on.

In addition, as described above, since the positive driving voltage Vop is provided to the source electrode of the turned-on first bootstrap transistor Mb1, a voltage (Vop+Vin), which is the sum of the power supply voltage Vin charged in the bootstrap capacitor Cboot and the positive driving voltage Vop, is provided as the upper driving voltage of the detection amplifier A. Therefore, the detection amplifier A operates by providing the sum of the power supply voltage Vin and the positive driving voltage Vop as the upper driving voltage and providing the power supply voltage Vin as the lower driving voltage.

The detection voltage generating unit 210 includes a scaled transistor Ms configured to scale and output the load current $I_{LOAD}$. A drain electrode and a gate electrode of the scaled transistor Ms are connected to those of the first driving unit connection switch S3, and thus the same voltage is formed. However, the first driving unit connection switch S3 is not destroyed even at high voltage and high current and has a large channel width/length ratio (W/L ratio) to secure current drivability. However, the scaled transistor Ms has a channel W/L ratio that is smaller than that of the first driving unit connection switch S3. As an example, the channel W/L ratio of the scaled transistor Ms may correspond to 1% to 10% of the channel W/L ratio of the first driving unit connection transistor.

One electrode of the first driving unit connection switch S3 is connected to a non-inverted input of the detection amplifier A, and the source electrode of the scaled transistor Ms is connected to the non-inverted input. When the first driving unit connection switch S3 is turned on in the second phase Φ2, the positive driving voltage Vop is provided to the non-inverted input through the first driving unit connection switch S3. In addition, since an inverted input of the detection amplifier A is connected to the source of scaled transistor Ms, a voltage of the source electrode of the scaled transistor Ms is also generated to be equal to the positive driving voltage Vop provided to the non-inverted input of the detection amplifier A.

The detection amplifier A controls the pass transistor Mpass to output a scaled current Isen. In the scaled transistor Ms, all the voltages of the drain electrode, the gate electrode, and the source electrode of the first driving unit connection switch S3 are the same, and only the channel W/L ratio is scaled. Therefore, the scaled current Isen output from the scaled transistor Ms corresponds to a scaled value of the load current $I_{LOAD}$.

As the pass transistor Mpass is turned on, the scaled current Isen flows in a detection resistor Rsen to generate the detection voltage Vsen. The low-pass filter LPF receives the detection voltage Vsen and generates and outputs the average detection signal Vavg corresponding to an average of the detection voltage Vsen. In the illustrated example, the low-pass filter LPF is illustrated as a first-order RC filter, but this is merely an example, and the low-pass filter LPF can be implemented with various types of low-pass filters such as a second-order filter and the like.

In one example, the scaled current Isen is obtained by scaling the load current load current $I_{LOAD}$ at a predetermined scaling ratio and corresponds to the load current load current $I_{LOAD}$. The detection voltage Vsen is generated by the scaled current Isen flowing in the detection resistor Rsen, and the average detection signal Vavg corresponds to the average of the detection voltage Vsen. Therefore, a value of average detection signal Vavg corresponds to the average value of load current $I_{LOAD}$. That is, the average detection signal may be expressed as the following Equation 2.

$$V_{avg} = K \times I_{LOAD} \qquad \text{[Equation 2]}$$

In Equation 2, K denotes a proportional constant and may be controlled by adjusting a resistance value of the detection resistor Rsen and a scaling ratio of the scaled transistor.

The error amplifier EA receives the average detection signal Vavg and the reference signal Vref, amplifies a difference therebetween, and outputs the amplified difference. The reference signal Vref provided to the error amplifier EA is a controllable signal. As an example, the duty ratios of control signals S1, S2, . . . , and S5 (see FIG. 2) of the switches, which are output from the current controller 200, may be adjusted by adjusting the reference signal Vref.

The PWM modulator 230 receives the signal output from the error amplifier EA. In addition, the PWM modulator 230 further receives a periodic signal such as a triangle wave or a sawtooth wave input from an oscillator (not shown) and compares the periodic signal with the signal output from the error amplifier to form a PWM control signal.

The gate driver may increase the level of the PWM control signal output from the PWM modulator 230 to form and output a control signal provided to the gates of the switches included in the first and second driving units.

Experimental Results and Simulation Results

Figure 9:
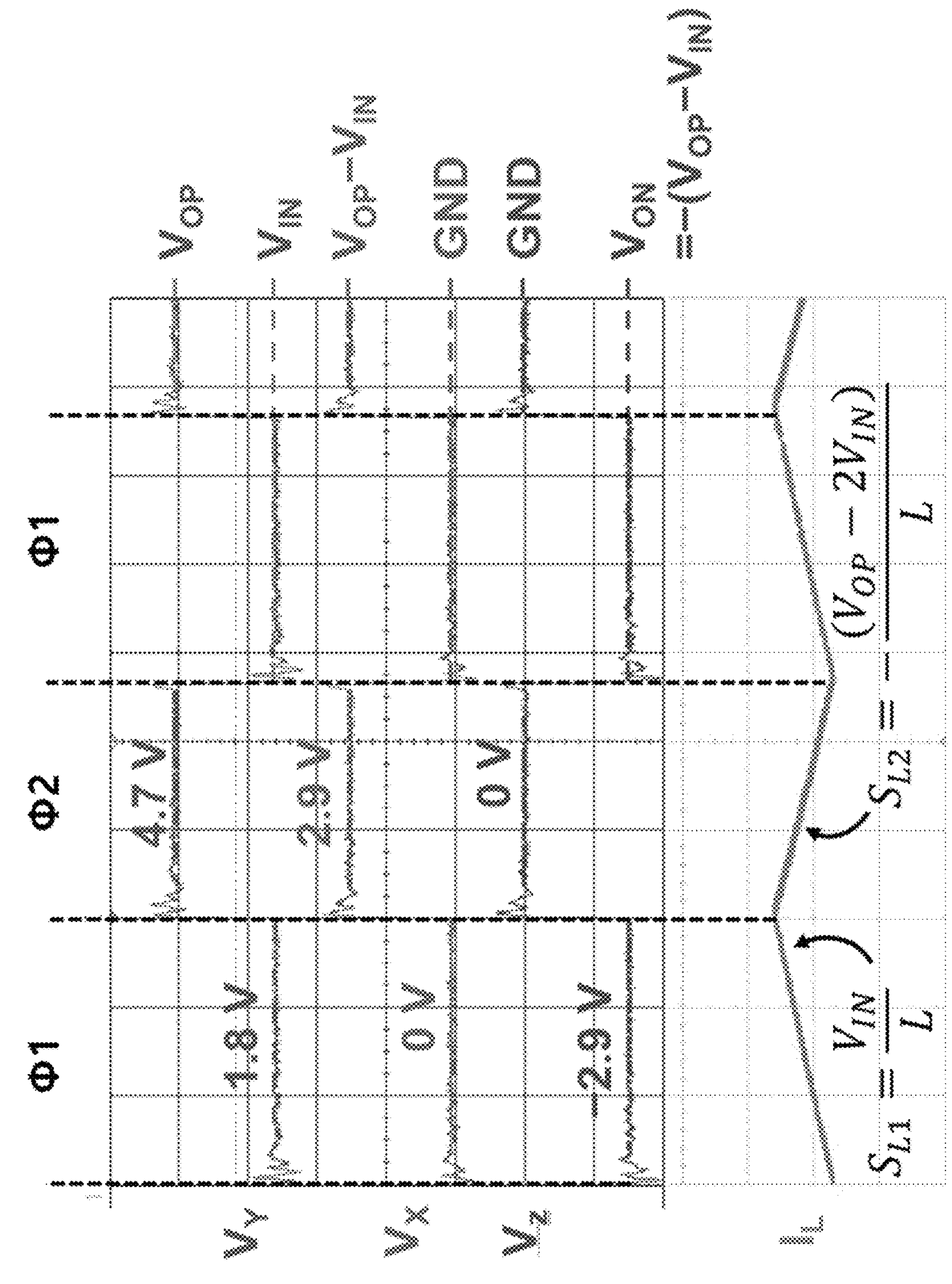
FIG. 9 is a diagram illustrating the simulation results of the load driving device of this embodiment at a switching frequency of 0.89 MHz.

FIG. 9 is a diagram illustrating the simulation results of the load driving device of this embodiment at a switching frequency of 0.89 MHz. As shown in FIG. 9, it can be seen that the voltages Vx, Vy, and Vz at node x, node y, and node z are formed according to the desired waveforms, and voltage stress formed between the drains and the sources of the switches decreases to Vop-Vin.

Figure 10:
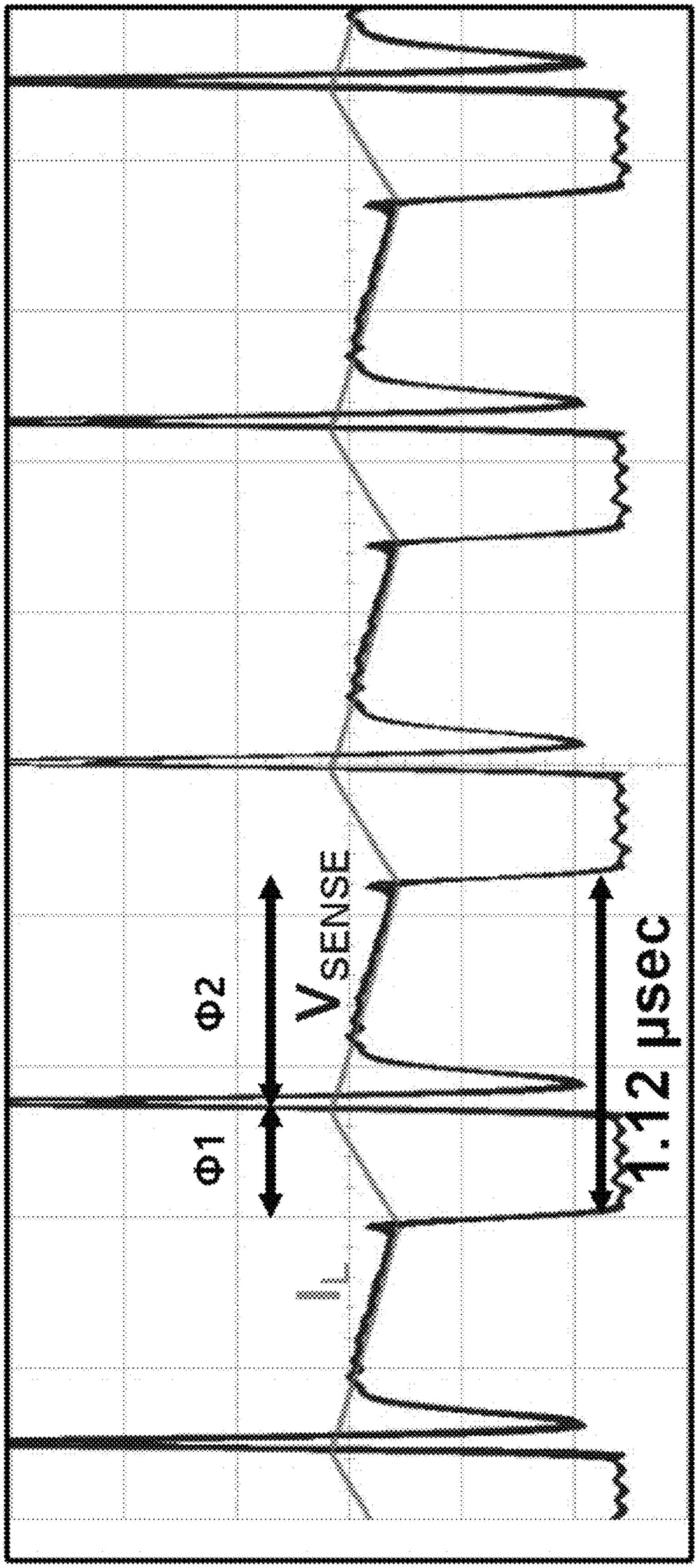
FIG. 10 is a diagram illustrating an output waveform of the current controller.

FIG. 10 is a diagram illustrating an output waveform of the current controller. Since the current controller detects the load current $I_{LOAD}$ in the second phase Φ2 and generates a corresponding detection voltage Vsense, it can be confirmed that the detection voltage Vsense is generated according to the inductor current value in the second phase Φ2.

The detection amplifier of the current controller according to the present invention operates using the voltage generated by bootstrapping and operates only in the second phase of the driving device. Therefore, an advantage of being able to reduce power consumed for driving is provided.

Furthermore, according to the present invention, the current provided to the load unit can be controlled by detecting a current and through the operation of the first driving unit and the second driving unit. Therefore, by controlling the current provided to the load, an advantage of being able to minimize the variation in electrical characteristics of the load over time is provided. According to the present invention, since a high conversion gain is achieved, a light emitting device with a high threshold voltage can be easily used as the load. Furthermore, according to the present invention, since the current is controlled, an advantage of being relatively free from degradation resulting from the variation in electrical characteristics due to heat is provided.

In order to aid understanding of the present invention, the description has been made with reference to embodiments shown in the accompanying drawings, but these embodiments are for implementation and are merely illustrative. Thus, those skilled in the art will appreciate that various modifications and equivalent other embodiments can be derived without departing from the scope of the present invention. Therefore, the true technical scope of the present invention should be defined by the appended claims.

The invention claimed is:

1. A load driving device comprising:

a step-up converter which includes a first driving unit including an inductor and a first fly capacitor and configured to charge energy provided from a power supply by connecting an inductor and a first fly capacitor in parallel in a first phase and discharge the charged energy by connecting the inductor and the first fly capacitor in series in a second phase, and a second driving unit including a second fly capacitor configured to charge energy provided by the power supply in the second phase and discharge the energy charged in the first phase, which boosts a power supply voltage provided by the power supply and provides the power supply voltage to a load unit; and a current controller configured to detect a load current flowing in the load unit and control the step-up converter to control a current provided to the load unit.

2. The load driving device of claim 1, wherein:

the first driving unit and the second driving unit provide voltages to the load unit; and the voltage provided by the first driving unit to the load unit and the voltage provided by the second driving unit to the load unit are voltages of opposite signs.

3. The load driving device of claim 1, wherein the first phase and the second phase are combined to form one period.

4. The load driving device of claim 1, wherein the first driving unit further includes a connection control switch whose one end and the other end are connected to the inductor and the first fly capacitor, respectively, and the connection control switch is turned off to connect the inductor and the first fly capacitor in series.

5. The load driving device of claim 1, wherein the first driving unit further includes:

a ground connection switch which is turned on in the first phase to connect a ground to the first driving unit and the second driving unit; and a first driving unit connection switch which is turned on in the second phase to connect the first driving unit to the load unit to provide energy.

6. The load driving device of claim 1, wherein the second driving unit further includes:

a second driving unit ground connection switch which is turned on in the second phase to connect a ground to the second driving unit; and a second driving unit connection switch which is turned on in the first phase to connect the second driving unit to the load unit to provide energy.

7. The load driving device of claim 1, wherein the load unit includes:

a first load capacitor whose one end is connected to the first driving unit and the other end is connected to a ground in series;

a second load capacitor whose one end is connected to the second driving unit and the other end is connected to the ground in series; and a load connected to the first load capacitor and the second load capacitor in parallel.

8. The load driving device of claim 1, wherein the power supply includes a flexible battery, and the load includes a light emitting device.

9. The load driving device of claim 1, wherein the step-up converter outputs a boosted voltage to the load unit by connecting the inductor to the capacitor in series in the second phase.

10. The load driving device of claim 1, wherein the current controller includes:

a detection voltage generating unit configured to output a detection voltage corresponding to an average of a current flowing in the load unit; and a control signal generating unit configured to generate control signals for the first driving unit and the second driving unit from the detection voltage.

* * * * *